(12) United States Patent
Abdalla et al.

(10) Patent No.: US 11,673,077 B2
(45) Date of Patent: Jun. 13, 2023

(54) FILTRATION SYSTEM WITH DUAL LIP SEAL

(71) Applicant: CUMMINS FILTRATION IP, INC., Columbus, IN (US)

(72) Inventors: Wassem Abdalla, Cookeville, TN (US); Amol Sukhdev Gangadhare, Sangola (IN); Gerard Malgorn, Ergue Gaberic (FR); Swati Sakharam Yesane, Maharshtra (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 442 days.

(21) Appl. No.: 16/755,957

(22) PCT Filed: Oct. 17, 2018

(86) PCT No.: PCT/US2018/056235
§ 371 (c)(1),
(2) Date: Apr. 14, 2020

(87) PCT Pub. No.: WO2019/079412
PCT Pub. Date: Apr. 25, 2019

(65) Prior Publication Data
US 2020/0289963 A1 Sep. 17, 2020

(30) Foreign Application Priority Data
Oct. 21, 2017 (IN) .............................. 201741037236

(51) Int. Cl.
*B01D 29/00* (2006.01)
*B01D 35/16* (2006.01)

(52) U.S. Cl.
CPC ..... *B01D 29/0004* (2013.01); *B01D 29/0095* (2013.01); *B01D 35/16* (2013.01);
(Continued)

(58) Field of Classification Search
CPC ............ B01D 29/0004; B01D 29/0095; B01D 35/16; B01D 2201/0415; B01D 2201/304;
(Continued)

(56) References Cited

U.S. PATENT DOCUMENTS 6,543,625 B1 * 4/2003 Le Roux ................ B01D 29/96
210/450
2008/0035587 A1 * 2/2008 Wieczorek ............. B01D 35/16
210/791

(Continued)

OTHER PUBLICATIONS

International Search Report and Written Opinion issued for PCT/US2018/056235, dated Dec. 21, 2018, 16 pages.

Primary Examiner — Madeline Gonzalez
(74) Attorney, Agent, or Firm — Foley & Lardner LLP

(57) ABSTRACT

Various embodiments relate to a filtration system. The filtration system includes a housing having a drain. A filter element is positioned within the housing. The filter element comprises a first endplate and a second endplate. Filter media is positioned between the first endplate and second endplate. A dual lip seal member is coupled to the second endplate. The dual lip seal member includes a first protrusion that extends radially outward around an outer surface of the dual lip seal member. A second protrusion extends radially outward around the outer surface of the dual lip seal member. The dual lip seal member is configured to prevent fluid to be filtered from exiting the housing through the drain when the filter element is in an installed position. The dual lip seal member permits residual fluid to exit the housing through the drain when the filter element is displaced from the installed position.

14 Claims, 4 Drawing Sheets

(52) U.S. Cl.
CPC ............... *B01D 2201/0415* (2013.01); *B01D 2201/304* (2013.01); *B01D 2201/347* (2013.01)

(58) Field of Classification Search
CPC ........ B01D 2201/347; B01D 2201/316; B01D 29/21; B01D 2201/291; B01D 2201/4053; B01D 35/153; B01D 29/00
USPC .... 210/450, 248, 433.1, 435, 437, 441, 443, 210/455, 282, 493.2; 55/502
See application file for complete search history.

(56) References Cited

U.S. PATENT DOCUMENTS

| | | |
|---|---|---|
| 2008/0294351 A1 | 11/2008 | Akitomi |
| 2009/0294351 A1 | 12/2009 | Herman et al. |
| 2011/0084016 A1 | 4/2011 | Le Roux et al. |
| 2014/0230389 A1 | 8/2014 | Jokschas et al. |

* cited by examiner

FILTRATION SYSTEM WITH DUAL LIP SEAL

CROSS REFERENCE TO RELATED APPLICATIONS

The present application is a national stage of PCT Application No. PCT/US2018/056235, filed Oct. 17, 2018 which claims priority to Indian Provisional Patent Application No. 201741037236, filed Oct. 21, 2017. The contents of these applications are incorporated herein by reference in their entirety and for all purposes.

TECHNICAL FIELD

The present application relates to filtration systems. More particularly, the present application relates to fluid filtration systems having a replaceable filter element.

BACKGROUND

Fluid filtration systems are used to provide clean fluid to a device. For example, internal combustion engines may have multiple filtration systems to provide clean fuel, clean oil, and clean fluid (e.g., liquid, air, hydraulic, etc.) to the various components of the internal combustion engines. Each filtration system generally includes a filter element having a filter media that filters the fluid. Some filtration systems, such as fuel and oil filtration systems, often use replaceable filter elements that require periodic filter element replacement services to ensure proper filtration of the fluids. In some filtration systems, the filter element can remain immersed in the fluid to be filtered even when not in use. For example, after operation of an internal combustion engine has ceased, residual fuel to be filtered by a fuel filter element may remain in the filter element housing. In such situations, the residual fuel may spill from the filtration system during removal of the housing (e.g., removal of a housing that contains the filter element) or removal of the filter element from the housing during a service operation to change the filter element.

Filter elements (e.g., filter cartridges) often include a seal member that is compressed against a component of the filtration system housing or another portion of the filtration system. The seal member forms a seal between the filtration system housing and the filter element, thereby preventing fluid from bypassing the filter elements (e.g., for air to bypass an air filter element or liquid to bypass a liquid filter element). If an improper filter element (i.e., a non-authorized or non-genuine filter element) is installed in a filtration system, or if the proper filter element is installed incorrectly, the seal member of the filter element may not form a proper seal, and fluid may bypass the filter element, causing damage to downstream components or a drop in operating pressure. Accordingly, the installation of an improper filter element can harm critical components in the filtration system, cause improper sealing, diminish emission compliance mechanisms, cause subpar performance, and the like.

SUMMARY

One example embodiment relates to a filtration system. The filtration system includes a housing having a drain. A filter element is positioned within the housing. The filter element includes a first endplate and a second endplate. Filter media is positioned between the first endplate and second endplate. A dual lip seal member is coupled to the second endplate. The dual lip seal member comprises a first protrusion that extends radially outward around an outer surface of the dual lip seal member. A second protrusion extends radially outward around the outer surface of the dual lip seal member. The dual lip seal member is configured to prevent fluid to be filtered from exiting the housing through the drain when the filter element is in an installed position. The dual lip seal member permits residual fluid to exit the housing through the drain when the filter element is displaced from the installed position.

Another example embodiment relates to a filter element. The filter element includes a first endplate and a second endplate. Filter media is positioned between the first endplate and second endplate. A dual lip seal member is coupled to the second endplate. The dual lip seal member comprises a first protrusion that extends radially outward around an outer surface of the dual lip seal member. A second protrusion extends radially outward around the outer surface of the dual lip seal member. The dual lip seal member is configured to prevent fluid to be filtered from exiting through a drain when the filter element is in an installed position in a housing. The dual lip seal member permits residual fluid to exit through the drain when the filter element is displaced from the installed position.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a filtration system with a filter element that includes a dual lip seal (e.g., a dual lip seal member) that functions as an anti-drain seal. The dual lip seal member prevents fluid (e.g., fuel) being filtered from flowing back to a fluid storage tank (e.g., a fuel tank) through a drain in the filter housing when the filter element is in an installed position within the filter housing. Stated differently, the dual lip seal member prevents the dirty (e.g., yet to be filtered) fluid traveling through the inlet from flowing into the fluid storage tank. Further, the configuration of the dual lip seal member with the filter housing allows fluid to flow back to the fluid storage tank when the filter element is being removed from the filter housing (e.g., during a filter change service). Additionally, the dual lip seal member prevents fuel on the dirty side (e.g., inlet) of the filter element from entering a water sump of the filtration system, thereby eliminating the need for a separate seal member. Non-compatible filter elements without the dual lip seal member will permit fluid to return to the fluid tank when the non-compatible filter element is installed in the filtration system. Since the fuel returns to the tank when the engine is off, the lack of fuel will cause a hard engine start when the engine is being restarted. Accordingly, the dual lip seal member also functions as an engine integrity protection mechanism, helping to ensure that an installed filter element is genuine (i.e., authorized, Original Equipment Manufacturer ("OEM") approved, etc.). Thus, the dual lip seal member performs multiple functions (anti-drain back to tank functions, draining functions, and engine integrity protection functions), thereby reducing the cost over traditional filter elements that require three separate components for each of the functions.

Figure 1:
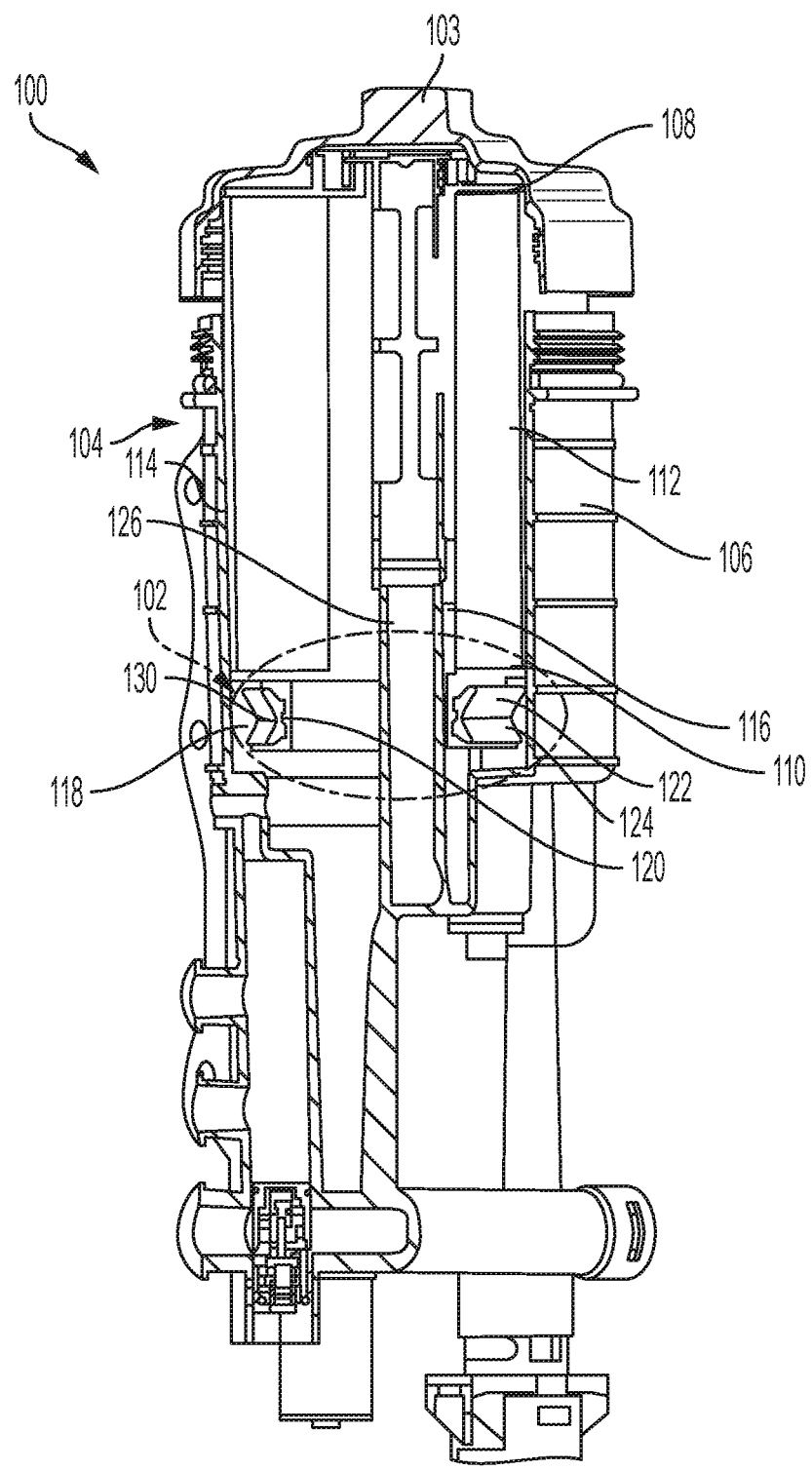
FIG. 1 shows a cross-sectional view of a filtration system that includes a filter element with a dual lip seal member, according to an example embodiment.

Referring to FIG. 1, a cross-sectional view of a filtration system 100 that includes a filter element 104 with a dual lip seal member 102 is shown, according to an example embodiment. The filtration system includes a filter element 104, a complementary housing 106, and a filter mounting head 103. The filter element 104 is installed in an interior compartment of a housing 106 in an installed position (i.e., in an operational position that permits filtering of the fluid). In the installed or operational position, the filter element 104 is connected to a filter mounting head (e.g., as described above) and the housing 106 is also attached to the filter mounting head 103 (e.g., via a threaded connection in arrangements where the housing 106 is a spin-on housing). The filter element 104 includes a dual lip seal member 102 that forms a radial seal between the filtration system housing 106 and the filter element 104, thereby preventing fluid from bypassing the filter element 104. Generally, when the filter element 104 is received in the installed position within the housing 106 (i.e., the filtration system 100 is assembled), the dual lip seal member 102 forms a seal between the housing 106 and the filter element 104. The dual lip seal member 102 prevents the fluid from exiting the housing 106 through the drain passage 118. As will be appreciated, if an improper filter element (i.e., a non-authorized or non-genuine filter element) is installed in a filtration system 100, or if the proper filter element is installed incorrectly, the dual lip seal member 102 of the filter element 104 may not form a proper seal, and fluid may bypass the filter element 104 causing damage to downstream components or improper operation of the filtration system 100 or other components.

The filter element 104 includes a first endplate 108, a second endplate 110, filter media 112, and the dual lip seal member 102. The filter element 104 may be a cylindrical filter element with similarly shaped components. The filter media 112 includes an inner clean (e.g., filtered fuel) side 116 and an outer dirty (e.g. unfiltered fuel) side 114. Accordingly, the filter element 104 is an outside-in flow filter element. In an alternative arrangement, the filter element 104 is an inside-out flow filter element having an inner dirty side 114 and an outer clean side 116. Fluid to be filtered passes from the dirty side 114 of the filter media 112 to the clean side of the filter media 112. The filter media 112 may include any of paper-based filter media, fiber-based filter media, foam-based filter media, or the like. The filter media 112 is disposed between the first endplate 108 and the second endplate 110.

As shown in FIG. 1, the first endplate 108 is coupled to a first, top end of the filter media 112. The first endplate 108 may include a plurality of retention tabs to secure the filter element 104 to a filter mounting head of the filtration system 100 when the filter element 104 is installed in the filtration system 100. For example, the retention tabs may form a snap-fit connection with the filter mounting head 103 of the filtration system 100 as the filter element 104 is installed in the filtration system 100. The retention tabs removably secure the filter element 104 to the mounting head during removal of the housing 106 of the filtration system 100, thereby permitting residual fluid in the housing to drain past the dual lip seal member 102 back into a fluid storage tank.

The filter element 104 further includes a second endplate 110 coupled to a second, bottom end of the filter media 112. In some embodiments, the second endplate 110 includes a central opening. The central opening is sized and shaped to receive a component of a filtration system (e.g., a standpipe) when the filter element 104 is installed in an operating position within the filtration system. In other embodiments, the central opening is in fluid communication with a water sump. The first endplate 108 may also include a central opening. The central opening may route fluid and air to a component (e.g., to an internal combustion engine). The central opening may be configured to be in fluid communication with a center housing portion 126 of the housing 106.

The filter element 104 includes a dual lip seal member 102. The dual lip seal member 102 is configured as an anti-drain dual lip seal member. The dual lip seal member 102 includes a central opening 120, a first protrusion 122, and a second protrusion 124. The dual lip seal member 102 comprises a cylindrical seal member with the first protrusion 122 and second protrusion 124 being disposed around the outer surface of the seal member 102. The dual lip seal member 102 is disposed adjacent to the drain passage 118 in the housing 106 that is in fluid communication with the fluid storage tank (not shown). The dual seal member may be formed concentrically (e.g., having a common center) with the filtration system 100 or eccentrically (e.g., not having a common center) with the filtration system 100 (as shown below in FIGS. 4A-4B). The dual lip seal member 102 is coupled to the second endplate 110. In some embodiments, the dual lip seal member 102 is disposed around an outer surface of the second endplate 110, the outer surface extending axially away from a bottom surface of the second endplate 110 away from the first endplate 108. In some embodiments, the dual lip seal member 102 and the second endplate 110 may be manufactured as a single, integrated piece (e.g., via an over molding or heat staking process). In other embodiments, the second endplate 110 includes a retaining member, such that a snap-fit connection is formed between the retaining member and central opening 120 of the dual lip seal member 102. The snap-fit connection removably secures the dual lip seal member 102 to the second endplate 110. The central opening 120 of the dual lip seal member 102 is aligned with a central opening that is configured to allow a component (e.g., the standpipe) to be received through the central opening 120 of the dual lip seal member 102.

The first protrusion 122 and the second protrusion 124 provide a radial seal with both the top and bottom side of the second endplate 110. Beneficially in a particular embodiment, the dual lip seal member 102 includes two different lip seal diameters, as the first protrusion 122 has a first diameter and the second protrusion 124 has a second diameter. Accordingly, the diameters of the first protrusion 122 and the second protrusion 124 may be adjusted to provide ease of installation of the filter element 104 into the housing 106. This ensures that the assembly of the filter element 104 and housing 106 is successful only when the filter element 104 and housing 106 are properly aligned (e.g., sealed). In some embodiments, the first diameter and the second diameter may be substantially similar. In other embodiments, the first diameter and the second diameter are different diameters.

Figure 2:
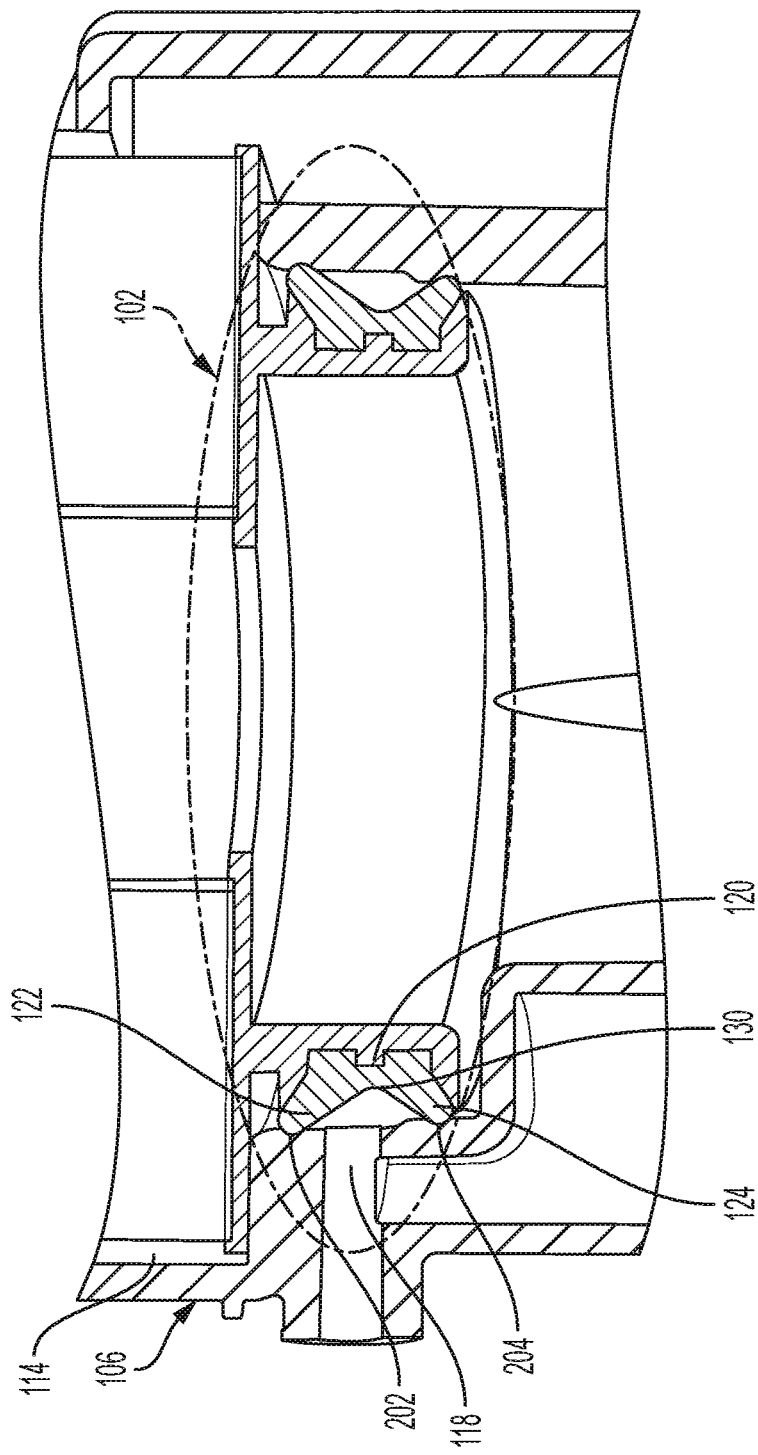
FIG. 2 shows a cross-sectional view of the dual lip seal member of the filtration system of FIG. 1.

As shown in FIGS. 1 and 2, the dual lip seal member 102 includes a first protrusion 122 and a second protrusion 124 comprising a generally sideways 'v'-shape, with the center 130 of the dual lip seal (e.g., the indention of the tip of the 'v' shape) being adjacent to the drain passage 118. The first protrusion 122 and the second protrusion 124 extend around the outer surface around the dual lip seal member 102. In some embodiments, the first protrusion 122 extends at a substantially 45-degree angle above a horizontal axis and the second protrusion extends at a substantially 45-degree angle below the horizontal axis, where the horizontal axis is parallel to the horizontal surface of the second endplate 110. While the dual lip seal member 102 is shown having two protrusions in a generally sideways 'v'-shape, a wide variety of configurations may be implemented including variations in the shape of the dual lip seal member 102, size of dual lip seal member 102, and number of protrusions of the dual lip seal member 102. The dual lip seal member 102 is configured to have a shape, length, width, and number of elements that is specifically tailored to interface with an inner surface of the housing 106. For example, the dual lip seal member 102 may comprise two separate O-rings, multiple lips, or other various shapes and configurations involving one or more lips and O-rings. This ensures that the assembly of the filter element 104 and housing 106 is successful only when the filter element 104 and housing 106 are properly aligned (e.g., sealed) and ensure engine integrity (e.g., genuine filter element 104).

Referring to FIG. 2, a cross-sectional view of the dual lip seal member 102 of the filtration system 100 of FIG. 1 is shown. FIG. 2 shows the area of the filter element 104 near the second endplate 110. The first protrusion 122 of the dual lip seal member 102 presses against a first portion 202 of an inner surface of the housing 106 and the second protrusion 124 of the dual lip seal member 102 presses against a lower, second portion 204 of the inner surface of the housing 106. The drain passage 118 is located between the first protrusion 122 and the second protrusion 124 and adjacent the base formed by the first protrusion 122 and second protrusion 124. Thus, the first protrusion 122 and the second protrusion 124 create a one-way valve, allowing the fluid to enter the housing 106 and preventing the fluid from returning back to the fluid storage tank. Accordingly, the dual lip seal member 102 prevents fluid to be filtered from exiting through a drain passage 118 located in the housing 106 while the filter element 104 is received in the installed position within the housing 106. In such arrangements, the drain passage 118 connects the housing 106 to a fluid storage tank (e.g., the fuel tank of a vehicle powered by the internal combustion engine). Accordingly, the dual lip seal member 102 functions as an anti-drain back to the storage tank when the filter element 104 is installed in the housing 106 (e.g., between filter service operations).

Figure 3:
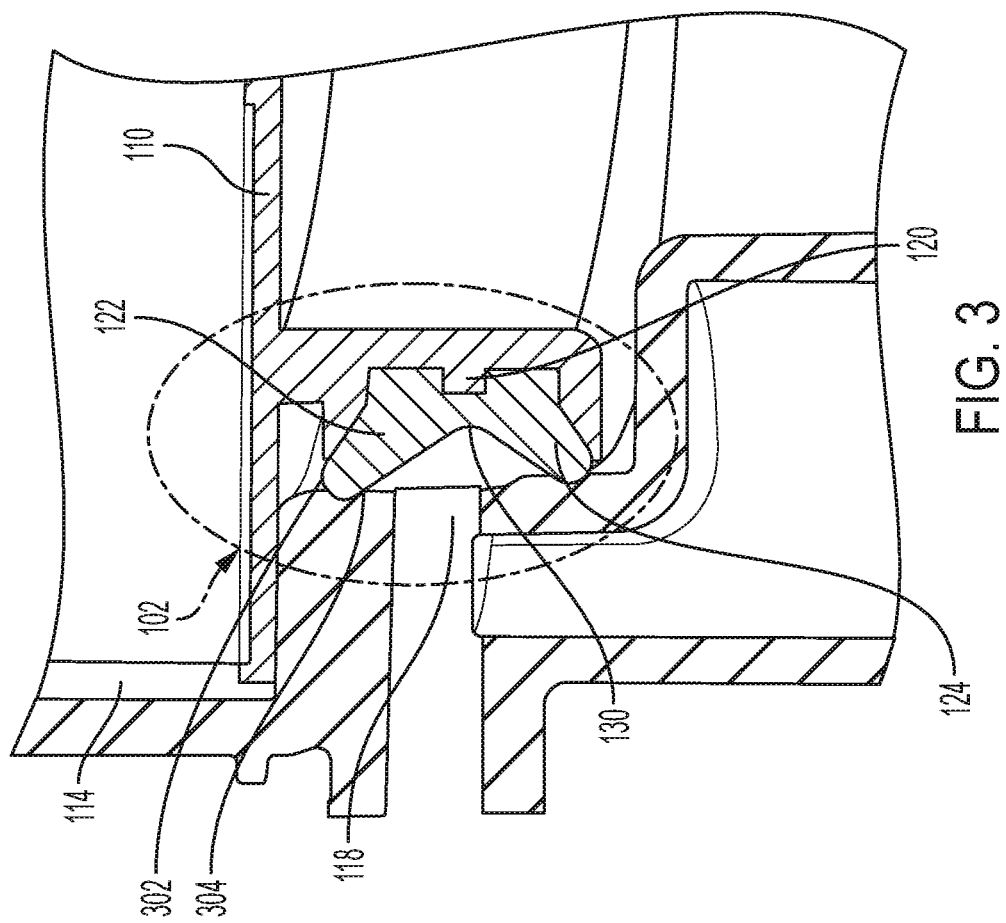
FIG. 3 shows an exploded cross-sectional view of the dual lip seal member of FIG. 1.

FIG. 3 shows a close-up cross-sectional view of the dual lip seal member 102 interacting with the housing 106 when the filter element 104 is received in the installed position within the housing 106. As shown in FIG. 3, the dual lip seal member includes the first protrusion 122 and the second protrusion 124. The first protrusion 122 and the second protrusion 124 may include flexing features or flanges to provide sealing between the housing 106 and the filter element 104. The flexing features allow the first and/or second protrusions (122,124) of the dual lip seal member 102 to flex with respect to the main body of the dual lip seal member 102. Accordingly, the flexing features can assist in creating the dual lip seal member between the first protrusion 122 and the housing 106 and the second protrusion 124 and the housing 106. The flexing features may comprise grooves or cuts in the dual lip seal member 102 positioned at the joint between each of the first protrusion 122 and the second protrusion 124 and the main body of the dual lip seal member 102. The flexing features also permit the dual lip seal member 102 to flex during full fluid flow, which reduces restriction and potential damage to the dual lip seal member 102 (e.g., reduces the risk of permanent deformation of the dual lip seal member 102). In some embodiments, one or both of the first protrusion 122 and the second protrusion 124 include a first node 302 and a second node 304 (generally in the location shown in FIG. 3). The inclusion of the first node 302 and the second node 304 on either one of the first protrusion 122 and second protrusion 124 creates a tighter seal between the dual lip seal member 102 and the inner surfaces (202,204) of the housing 106.

Accordingly, when the filter element 104 is received in the installed position within the filtration system (i.e., within the housing 106 when both the housing 106 and the filter element 104 are secured to the filter mounting head 103), the dual lip seal member 102 forms a radially directed seal between the housing 106 and the first protrusion 122 and the second protrusion 124 and the housing 106. The dual lip seal member 102 prevents the fluid from exiting the housing 106 through the drain passage 118. During servicing of the filter element 104 (e.g., during filter element replacement) by a technician, the technician first removes the housing 106 from the filter mounting head 103. In doing so, the housing 106 is displaced relative to the filter element 104.

As mentioned above, the dual lip seal member 102 provides clean servicing (e.g., when the dirty fuel is drained to the tank). By way of example, the housing 106 is removed (e.g., spun off) from a filter mounting head and the filter element 104 remains attached to the filter mounting head 103 through the retention tabs (e.g., as discussed above with respect to FIG. 1). Accordingly, the housing 106 slides with respect to the dual lip seal member 102. The housing 106 includes a variable inner diameter. When the filter element 104 is in the installed position, the first protrusion 122 and the second protrusion 124 of the dual lip seal member 102 form a dual lip seal against a first portion 202 and second portion 204, respectively, of the housing 106. When the housing 106 is displaced from the filter element 104 during removal of the housing 106 (e.g., during a filter replacement service), the first protrusion 122 and the second protrusion 124 slide to a third and fourth portion of the housing. The third and fourth portions have a larger diameter than the first portion 202 and second portion 204. The third and fourth portions may include vertical ribs that displace the first protrusion 122 and the second protrusion 124 from the surface of the third and fourth portions thereby eliminating the dual seal between the dual lip seal member 102 and the housing 106. The vertical ribs prevent the first protrusion 122 and the second protrusion 124 from being pressed against the surface of the third and fourth portions by the weight of the residual fluid. As will be appreciated, because there is no dual lip seal member 102, fluid within the housing 106 can bypass the dual lip seal member 102 for draining out of the housing 106 through the drain passage 118. Accordingly, the filter element 104 can be serviced without spilling or wasting residual fluid in the housing 106.

Figure 4B:
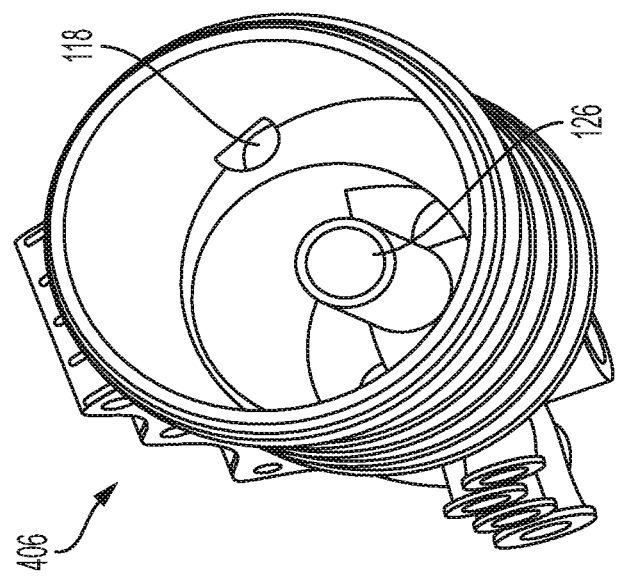
FIG. 4B shows a perspective view of a housing that is complementary to the filter element of FIG. 4A, according to an example embodiment.
Figure 4A:
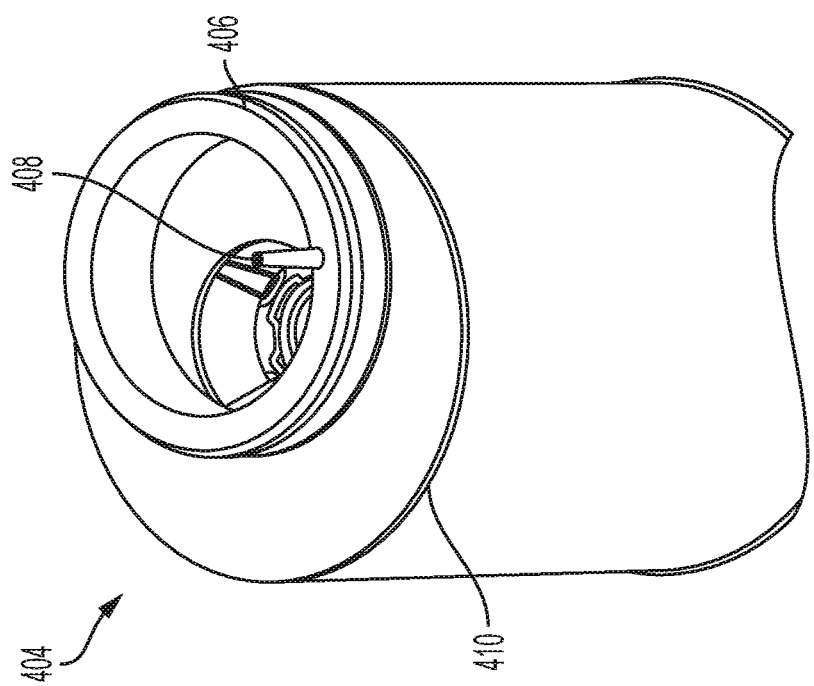
FIG. 4A shows a perspective view of a filter element that includes an eccentrically oriented dual lip seal member, according to another example embodiment.

Referring to FIG. 4A, a perspective view of a filter element 404 that includes an eccentrically (e.g., not sharing a common center) oriented dual lip seal member 402 on an endplate 410, according to another example embodiment. As will be appreciated, the eccentric filter element 404 is substantially similar to the concentric filter element 104 of FIGS. 1-3. Accordingly, the eccentric filter element 404 provides substantially the same benefits and features as the concentric filter element 104. As shown in FIG. 4A, the filter element 404 further includes a protruding member 408 to facilitate installation into the complementary housing 406. FIG. 4B shows a perspective view of a housing 406 that is complementary to the filter element of FIG. 4A, according to an example embodiment.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various exemplary embodiments without departing from the scope of the present invention.

What is claimed is:

1. A filtration system comprising:
    a housing including a drain; and
    a filter element positioned within the housing, the filter element comprising:
        a first endplate;
        a second endplate;
        filter media positioned between the first endplate and the second endplate; and
        a dual lip seal member coupled to the second endplate, the dual lip seal member comprising a first protrusion that extends radially outward around an outer surface of the dual lip seal member, a second protrusion that extends radially outward around the outer surface of the dual lip seal member, and a center portion disposed between the first protrusion and the second protrusion, the center portion being adjacent to the drain, the drain disposed between the first protrusion and the second protrusion, the dual lip seal member configured to prevent fluid from exiting the housing through the drain when the filter element is in an installed position within the housing and to permit residual fluid to exit the housing through the drain when the filter element is displaced from the installed position.

2. The filtration system of claim 1, wherein the first protrusion extends at a substantially 45-degree angle above a horizontal axis and the second protrusion extends at a substantially 45-degree angle below the horizontal axis, the horizontal axis parallel to the second endplate.

3. The filtration system of claim 1, wherein contact of the first protrusion and a first housing surface of the housing when in the installed position forms a first radial seal, wherein contact of the second protrusion and a second housing surface of the housing when in the installed position forms a second radial seal, the first housing surface disposed above the drain and the second housing surface disposed below the drain.

4. The filtration system of claim 3, wherein the first radial seal is configured to prevent fluid to be filtered from exiting the housing through the drain when the filter element is in an installed position within the housing and the second radial seal is configured to permit residual fluid to exit the housing through the drain when the filter element is displaced from the installed position.

5. The filtration system of claim 1, wherein the first protrusion has a first end and a second end, the first end in contact with the outer surface of the dual lip seal member, the second end comprising a first node and a second node, the first node and the second node configured to form a radial seal with an inner surface of the housing.

6. The filtration system of claim 1, wherein the first protrusion has a first outer diameter and the second protrusion has a second outer diameter, the first outer diameter being larger than the second outer diameter.

7. The filtration system of claim 1, wherein the dual lip seal member is removably coupled to the second endplate.

8. The filtration system of claim 7, wherein the dual lip seal member is removably coupled to the second endplate via a snap-fit connection.

9. The filtration system of claim 1, wherein the dual lip seal member is overmolded to the second endplate.

10. The filtration system of claim 1, wherein the second endplate further comprises an outer endplate surface extending axially from the second endplate away from the first endplate, the outer endplate surface comprising a cylindrical shape, wherein the dual lip seal member is removably coupled to the outer endplate surface.

11. The filtration system of claim 1, wherein when the filter element is in the installed position, the dual lip seal member forms a radial seal with the housing.

12. The filtration system of claim 1, wherein the first protrusion of the dual lip seal member comprises at least one flexing feature configured to allow the first protrusion of the dual lip seal member to flex.

13. The filter system of claim 1, wherein the dual lip seal member is disposed entirely on an outer radial surface of the second endplate.

14. The filter system of claim 1, wherein the drain is disposed in a sidewall of the housing, the center portion facing radially outward toward the drain.

* * * * *